US009825535B2

(12) United States Patent
Teo et al.

(10) Patent No.: US 9,825,535 B2
(45) Date of Patent: Nov. 21, 2017

(54) MULTI-MODE QUASI RESONANT CONVERTER

(71) Applicant: Infineon Technologies Austria AG, Villach (AT)

(72) Inventors: Yong Siang Teo, Singapore (SG); Xiaowu Gong, Singapore (SG); Siu Kam Kok, Singapore (SG)

(73) Assignee: Infineon Technologies Austria AG, Villach (AT)

( * ) Notice: Subject to any disclaimer, the term of this patent is extended or adjusted under 35 U.S.C. 154(b) by 38 days.

(21) Appl. No.: 14/823,699

(22) Filed: Aug. 11, 2015

(65) Prior Publication Data

US 2017/0047846 A1 Feb. 16, 2017

(51) Int. Cl.
*H02M 3/335* (2006.01)
*H02M 1/088* (2006.01)
*H02M 1/00* (2006.01)

(52) U.S. Cl.
CPC ............ *H02M 3/33507* (2013.01); *H02M 2001/0054* (2013.01)

(58) Field of Classification Search
None
See application file for complete search history.

(56) References Cited

U.S. PATENT DOCUMENTS

| 2008/0019161 | A1* | 1/2008 | Lee | H02M 1/44 363/89 |
| 2012/0200271 | A1* | 8/2012 | Henzler | H02M 3/156 323/235 |
| 2014/0300329 | A1* | 10/2014 | Thompson | H03K 5/1536 323/235 |

OTHER PUBLICATIONS

"ICE2QS01, Quasi-resonant PWM Controller," Infineon, Power Management & Supply, Data Sheet Version 2.2, Jul. 4, 2011, 18 pp.
"Quasi-Resonant PWM controller, ICE2QS03G," Infineon, Power Management & Multimarket, Data Sheet Version 2.3, Mar. 6, 2014, 24 pp.
"UCC28740 Constant-Voltage Constant-Current Flyback Controller Using Opto-Coupled Feedback," Texas Instruments, SLUSBF3B, Dec. 2014, 37 pp.

* cited by examiner

*Primary Examiner* — Timothy J Dole
*Assistant Examiner* — Monica Mata
(74) *Attorney, Agent, or Firm* — Shumaker & Sieffert, P.A.

(57) ABSTRACT

Techniques are described to adjust an amount of time a switch is turned off to control power delivered to a load. In some examples, the amount of time the switch is off includes a delay count value and a set count value based on an output power level. In some examples, the amount of time the switch is off includes a zero crossing delay value based on the input voltage level. Both of these example techniques increase the switching efficiency of the system.

20 Claims, 10 Drawing Sheets

| $V_{FB}$ | Up/Down Counter Action |
| --- | --- |
| Always lower than $V_{FBZL}$ | Count upwards. After the set count value has reached maximum number of zero crossing events, increase the delay count value. |
| Once higher than $V_{FBZL}$, but always lower than $V_{FBZH}$ | Stop counting. |
| Once higher than $V_{FBZH}$, but always lower than $V_{FBR1}$ | Count downwards until the default starting count |
| Once higher than $V_{FBR1}$ | Set up/down counter to default starting count |

FIG. 5

| Input Voltage(V) | Universal Input |
| --- | --- |
| Np Primary turns | 36.0 |
| Ns1 output 1 turns | 6.0 |
| Vout-1(V) | 12 |
| Iout-1(A) | 4 |
| Cds (pF) | 47 |
| Primary L (uH) | 359.20 |
| Rsense(ohm-real) | 0.36 |

| Ton | Input Voltage | | Switching Frequency | Input Voltage | | Input Power | Input Voltage | |
|---|---|---|---|---|---|---|---|---|
| | 265Vac | 85Vac | | 265Vac | 85Vac | | 265Vac | 85Vac |
| 1st ZC | | | 1st ZC | | | 1st ZC | | |
| Ton-max(us) | 1.8 | 8.0 | Freq. min(kHz) | 90.0 | 48.1 | Pin-max(W) | 69.8 | 62.2 |
| Ton-min(us) | 1.5 | 4.5 | Freq. max(kHz) | 113.1 | 83.9 | Pin-min(W) | 46.6 | 34.6 |
| 2st ZC | | | 2nd ZC | | | 2st ZC | | |
| Ton-max(us) | 1.8 | 6.3 | Freq. min(kHz) | 83.9 | 58.1 | Pin-max(W) | 65.7 | 46.2 |
| Ton-min(us) | 1.5 | 4.5 | Freq. max(kHz) | 103.5 | 78.8 | Pin-min(W) | 42.7 | 32.4 |
| 3rd ZC | | | 3rd ZC | | | 3rd ZC | | |
| Ton-max(us) | 1.8 | 6.3 | Freq. min(kHz) | 78.6 | 55.5 | Pin-max(W) | 62.1 | 44.1 |
| Ton-min(us) | 1.5 | 4.5 | Freq. max(kHz) | 96.5 | 73.8 | Pin-min(W) | 39.4 | 30.4 |
| 4th ZC | | | 4th ZC | | | 4th ZC | | |
| Ton-max(us) | 1.8 | 6.3 | Freq. min(kHz) | 73.8 | 53.1 | Pin-max(W) | 49.0 | 42.2 |
| Ton-min(us) | 1.5 | 4.5 | Freq. max(kHz) | 88.6 | 69.6 | Pin-min(W) | 38.5 | 28.7 |

| Ton | Input Voltage | | Switching Frequency | Input Voltage | | Input Power | Input Voltage | |
|---|---|---|---|---|---|---|---|---|
| | 265Vac | 85Vac | | 265Vac | 85Vac | | 265Vac | 85Vac |
| 1st ZC | | | 1st ZC | | | 1st ZC | | |
| Ton-max(us) | | 8.0 | Freq. min(kHz) | | 48.1 | Pin-max(W) | | 62.2 |
| Ton-min(us) | | 4.5 | Freq. max(kHz) | | 83.9 | Pin-min(W) | | 34.6 |
| 2st ZC | | | 2nd ZC | | | 2st ZC | | |
| Ton-max(us) | 1.8 | 6.3 | Freq. min(kHz) | 83.9 | 58.1 | Pin-max(W) | 46.2 | 46.2 |
| Ton-min(us) | 1.5 | 4.5 | Freq. max(kHz) | 103.5 | 78.5 | Pin-min(W) | 32.4 | 32.4 |
| 3rd ZC | | | 3rd ZC | | | 3rd ZC | | |
| Ton-max(us) | 1.8 | 6.3 | Freq. min(kHz) | 78.5 — 406 | 55.5 | Pin-max(W) | 52.1 — 408 | 44.1 |
| Ton-min(us) | 1.5 | 4.5 | Freq. max(kHz) | 96.5 | 73.8 | Pin-min(W) | 38.4 | 30.4 |
| 4th ZC | | | 4th ZC | | | 4th ZC | | |
| Ton-max(us) | 1.8 | 6.3 | Freq. min(kHz) | 73.8 | 53.1 | Pin-max(W) | 49.0 | 42.2 |
| Ton-min(us) | 1.5 | 4.5 | Freq. max(kHz) | 88.6 | 69.5 | Pin-min(W) | 38.5 | 28.7 |

| Switching Frequency | Input Voltage | | Switching Frequency | Input Voltage | |
|---|---|---|---|---|---|
| | 265Vac | 85Vac | | 265Vac | 85Vac |
| 8th ZC | | | 8th ZC | | |
| Freq. min(kHz) | 65.8 | 48.8 | Freq. min(kHz) | 65.8 | 48.8 |
| Freq. max(kHz) | 77.4 | 62.5 | Freq. max(kHz) | 77.4 | 62.5 |
| 7th ZC | | | 7th ZC | | |
| Freq. min(kHz) | 62.5 | 47.0 | Freq. min(kHz) | 62.5 | 47.0 |
| Freq. max(kHz) | 130.7 | 117.61 | Freq. max(kHz) | 72.5 | 59.0 |
| | | | 7th ZC + 1.0 delay | | |
| | | | Freq. min(kHz) | 59.4 | 45.2 |
| | | | Freq. max(kHz) | 68.7 | 56.7 |
| | | | 7th ZC + 2.0 delay | | |
| | | | Freq. min(kHz) | 56.7 | 43.6 |
| | | | Freq. max(kHz) | 65.1 | 54.2 |
| | | | 7th ZC + 5 Delay | | |
| | | | Freq. min(kHz) | 49.8 | 39.4 |
| | | | Freq. max(kHz) | 55.2 | 78.5 |

FIG. 8

MULTI-MODE QUASI RESONANT CONVERTER

TECHNICAL FIELD

The disclosure relates to controlling current or voltage at a load with a controller.

BACKGROUND

A controller can be used to control the amount of current flowing through a load in order to maintain a target current flowing through the load or to maintain a target voltage at the load. As one example, the controller may turn on and off a switch to control how long current flows through the load and how often current flows through the load in order to maintain the target current flowing through the load or to maintain the target voltage at the load.

SUMMARY

This disclosure describes techniques for increasing the switching efficiency of a switch that a controller turns on and off in order to control the current flow through the load or in order to control the voltage level at the load. In some examples, the controller may determine a delay count value and a set count value based on the output power level at a load. In these examples, the delay count value may reduce the switching frequency along with switching losses at low load thereby increasing overall switching efficiency of the switch. In some examples, the controller may determine a zero crossing delay value based on an input voltage at an input. In these examples, the zero crossing delay value may reduce the difference in switching frequency between low line and high line thereby increasing the overall switching efficiency of the switch.

In one example, the disclosure is directed to a method for controlling power delivered to a load, the method comprising detecting an output power level at the load, determining a delay count value and a set count value based on the output power level, detecting an input voltage level at an input, determining a zero crossing delay value based on the input voltage level, counting a plurality of zero crossing events based on the set count value and the zero crossing delay value, responsive to counting a last of the plurality of zero crossing events, counting one or more time increments based on the delay count value, and responsive to counting a last of the one or more time increments, activating a switch, wherein the switch controls the power delivered to the load.

In another example, the disclosure is directed to a system for controlling power delivered to a load. The system comprising a transformer comprising a primary side that includes a first coil and a secondary side that includes a second coil, wherein the load is connected to the second coil, a switch coupled to the first coil and a controller coupled to the switch. The controller configured to detect an output power level at the load, determine a delay count value and a set count value based on the output power level, detect an input voltage level at an input, determine a zero crossing delay value based on the input voltage level, count a plurality of zero crossing events based on the set count value and the zero crossing delay value, responsive to counting a last of the plurality of zero crossing events, counting one or more time increments based on the delay count value, and responsive to counting a last of the one or more time increments, activating a switch, wherein the switch controls the power delivered to the load.

In yet another example, the disclosure is directed to a controller for controlling power delivered to a load. The controller comprising an up/down counter unit configured to detect an output power level at the load, determine a delay count value and a set count value based on the output power level, and output the delay count value and the set count value. The controller comprising a first counter unit configured to receive the set count value from the up/down counter unit, detect an input voltage level at an input, determine a zero crossing delay value based on the input voltage level, count a plurality of zero crossing events based on the set count value and the zero crossing delay value, and output an indication after counting a last zero crossing event of the plurality of zero crossing events. The controller comprising a second counter unit configured to receive the delay count value from the up/down counter unit, receive the indication of the last zero crossing event from the first counter unit, count one or more time increments based on the delay count value, and activate a switch in response to counting a last of the one or more time increments, wherein the switch controls the power delivered to the load.

The details of one or more techniques of the disclosure are set forth in the accompanying drawings and the description below. Other features, objects, and advantages of the disclosure will be apparent from the description and drawings, and from the claims.

BRIEF DESCRIPTION OF DRAWINGS

FIG. 5 is a table illustrating an example of operations of an up/down counter based on a feedback voltage level.

FIG. 6 is a chart illustrating example parameters for the system of FIG. 1, in accordance with one or more examples described in this disclosure.

FIGS. 7A-7B are charts illustrating a comparison between high line and low line for the system of FIG. 6 when using a zero crossing delay value based on the input voltage level.

FIG. 8 is a chart illustrating a comparison between maximum and minimum switching frequencies for the system of FIG. 6 when using a delay count value and a set count value based on an output power level.

DETAILED DESCRIPTION

Figure 1:
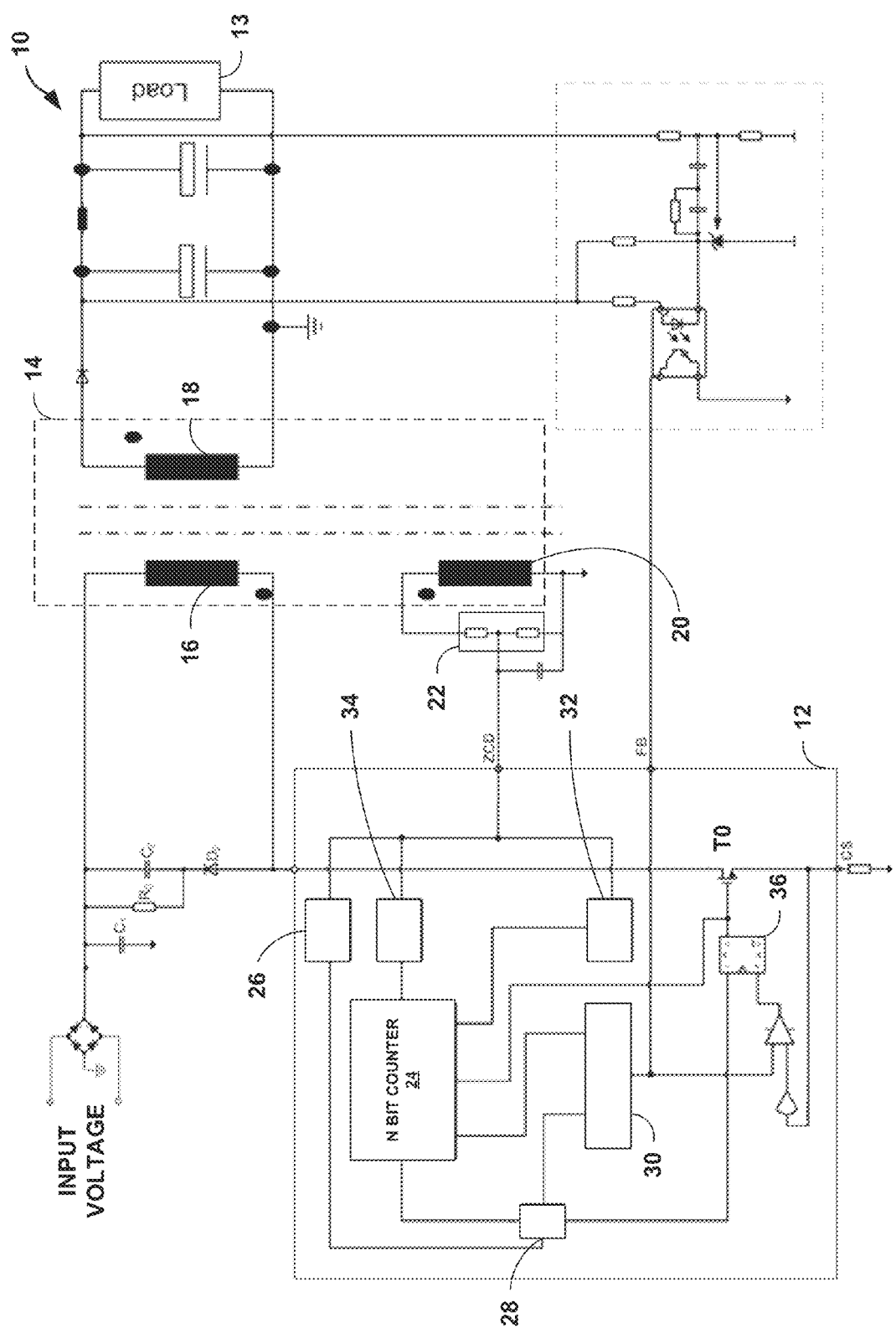
FIG. 1 is a circuit diagram illustrating an example of a system, in accordance with one or more examples described in this disclosure.

A controller such as a power adapter can be used to control the amount of current that flows through a load (e.g., a battery) that is connected to the controller. For example, the controller may control the current, so that the average amount of current flowing through the load (referred to as average load current) or the average voltage level at the load (referred to as average load voltage) is at a target current level or target voltage level. In this disclosure, the voltage level at the load refers to the potential across the load. In this disclosure, the voltage level at the input refers to the potential across the input.

In some examples, the load is connected to a flyback converter and a switch. However, topologies other than a flyback converter are possible, and the techniques described in this disclosure should not be considered limited to a flyback converter topology. The controller turns the switch on and off to control the amount of current that flows through the switch to control the average load current or average load voltage.

When current is flowing through the load and the switch is on, a voltage at a node of the switch is at a certain voltage level. When the current flowing through a coil connected to the load reaches zero and the switch is off, a voltage at the node of the switch tends to oscillate creating an oscillating voltage with voltage peaks and voltage valleys at the node of the switch. The node of the switch where the voltage may oscillate is referred to as the switch node, and voltage at the switch node is referred to as the switch node voltage.

As one example, the switch may comprise a transistor. In this example, when the switch is on, the transistor may be in the ohmic mode or active mode, and when the switch is off the transistor may in the cutoff mode. In some examples, where the switch is a transistor, the node of the switch where the voltage oscillates may be the drain node of the transistor. In other words, the switch node may be the drain node of the transistor, and the switch node voltage may be the voltage at the drain node of the transistor (i.e., the drain node voltage). However, the examples described in this disclosure are not limited to a transistor being the switch.

In some cases, the voltage difference is smallest between the switch node voltage at a valley of the oscillating voltage and the switch node voltage when the switch is on. Comparatively, the voltage difference is not the smallest between the switch node voltage at other non-valley voltage levels of the oscillating voltage and the switch node voltage when the switch is on. For instance, assume that the voltage at the switch node when the switch is on is X, and the voltage at a valley of the oscillating voltage at the switch node when the switch is off is Y. In this example, the voltage difference, Y minus X, is smaller than a non-valley voltage at the switch node during oscillation minus X.

Turning the switch on at a valley of the oscillating voltage may maximize the switching efficiency of the switch because the voltage at the switch node, at a valley of the oscillating voltage when the switch is off, is closest to the voltage at the switch node when the switch is on. Stated another way, the least amount of energy is needed to turn the switch back on when the switch is turned back on at a valley of the oscillating voltage as compared to turning the switch back on at a non-valley of the oscillating voltage because the difference in the switch node voltage when the switch is on and the switch node voltage during the oscillation is the smallest at a valley of the voltage oscillation. Switching the switch on (e.g., turning on the transistor, as one example) at a voltage valley is referred to as quasi-resonant switching.

However, the switching frequency of a quasi-resonant converter may increase when the load is reduced. Additionally or alternatively, in some examples, the switching frequency of a quasi-resonant converter may be increased when the input voltage level is increased. The increases in switching frequency of the quasi-resonant converter may also cause an increase in switching losses of the quasi-resonant converter thereby reducing the switching efficiency of the quasi-resonant converter. In some examples, the reduction in the switching efficiency may also degrade the electromagnetic interference (EMI) performance at high line of the quasi-resonant converter.

In some examples, the switching frequency of the controller may be internally pre-defined in the controller. For example, during frequency modulation operation, the switching cycles may be periods when energy is delivered to the output in fixed packets, where the power-per-cycle varies discretely with the switching period.

However, during operating conditions when the switching period may be relatively short, such as at high-load and low-line, the average power delivered per cycle varies significantly based on the number of valleys skipped between cycles. In other words, different valley-skipping cycle to cycle may add ripple voltage to the output with a frequency and amplitude dependent upon the loop-response of the shunt-regulator. Trimming may also be required to ensure that the internally defined frequency does not spread beyond a threshold and impact the power delivery. In these examples, trimming may also increase costs and the difficulty of the design.

According to techniques described herein, the quasi-resonant converter may achieve improved energy and switching efficiency by using an adaptive zero crossing foldback with increased frequency reduction. In this way, switching efficiency may be increased when at least one of the input voltage level is increased or the output power level is reduced. Additionally, the degradation EMI performance at high line will be improved due to the lower switching frequency. Trimming may also not be required, reducing the cost and difficulty of the design. Additionally, the switching frequency can be reduced at low load thereby increasing efficiency. In some examples, the techniques described herein may be optimized to avoid a controller entering burst mode at 10% load.

FIG. 1 is a circuit diagram illustrating an example of system 10, in accordance with one or more examples described in this disclosure. For example, FIG. 1 illustrates system 10 which includes controller 12 and load 13. Examples of system 10 include a circuit board with the illustrated components and controller 12, and a plug for plugging into a power source, such as an AC input source.

Controller 12 may be formed in an integrated circuit (IC) chip. Alternatively, one or more of the units of controller 12 may be formed in distinct IC chips. The units of controller 12 are illustrated as functional blocks to ease with understanding and may be combined or separated within controller 12. The units of controller 12 may be implemented as hardware or software or firmware executing on hardware.

In the example illustrated in FIG. 1, load 13 includes a battery. Accordingly, controller 12 includes a power adapter, where load 13 is the battery of a laptop computer. In general, system 10 may be a circuit configured to deliver power and load 13 may be a unit that receives power. For ease of description, the techniques described in this disclosure are described from the perspectives of controller 12 and/or system 10. However, the techniques described in this disclosure should not be considered so limiting and may be extended to other systems.

The battery of load 13 is charged when current flows through the battery. As illustrated, the flyback converter outputs the current to load 13 that causes the battery of load 13 to charge. For example, an AC input source (e.g., 85-265 $V_{AC}$) connects to system 10. The AC voltage of the input source is rectified through a full-wave rectifier (e.g., the four diodes coupled to the AC input source) and filtered with a capacitor. In examples where the input source is a DC input source, the rectifier may not be necessary, and the capacitor that is connected to the rectifier in FIG. 1 may be optionally connected to the DC input source.

Controller 12 may also be connected (not shown) to the full-wave rectifier and in this manner receives power from the input source. For example, the local voltage for controller 12 (referred to as $V_{CC}$) may be generated from the voltage outputted by the full-wave rectifier. The components and units of controller 12 may be powered by the $V_{CC}$ generated from the output of the full-wave rectifier. In the example of FIG. 1, controller 12 includes N-bit counter 24, variable delay counter 28, up/down counter 30, input voltage detection unit 32, zero crossing event detection unit 34, and switch T0. In some examples, switch T0 may be external to controller 12. In some examples, controller 12 may also include an optional resonant period detection unit 26. Resonant period detection unit 26 may be configured to detect the resonant period between two zero crossing events and store the resonant period information (e.g., store in memory). In some examples, resonant period detection unit 26 may be configured to output the resonant period information to variable delay counter 28. For example, resonant period detection unit 26 may provide a clock signal to variable delay counter 28 that corresponds to the resonant period of the zero crossing events.

Up/down counter 30 receives a feedback voltage indicative of an output power level at load 13 and determines a count value based on the output power level. For example, up/down counter 30 may receive a clock signal (e.g., a clock period of 48 milliseconds) and check the feedback voltage at every clock period. In some examples, up/down counter 30 may increase the count value, decrease the count value, not change the count value, or reset the count value according to the comparison of three predefined thresholds to the feedback voltage level. In some examples, the set zero crossing count value (referred to as "set count value" and further described in FIGS. 2-4) and a delay count value (further described in FIGS. 3 and 4) may correspond to the count value of up/down counter 30. In these examples, the delay count value may be equal to the count value minus the maximum number of zero crossing events that can be detected by zero crossing detection unit 34.

In this way, up/down counter 30 may determine with the feedback voltage whether switch T0 can be turned on by counting zero crossing events with N-bit counter 24 and no delay increments with variable delay counter 28. Additionally, up/down counter 30 may determine with the feedback voltage whether switch T0 can be turned on by counting both zero crossing events with N-bit counter 24 and delay increments with variable delay counter 28. For example, depending on the output power level, up/down counter 30 may output the set count value to N-bit counter 24 and output delay count value equal to zero to variable delay counter 28, and the set count value may be the number of zero crossing events to be counted by N-bit counter 24 before turning on switch T0. Additionally, in some examples, depending on the output power level, up/down counter 30 may output the delay count value to variable delay counter 28, and the delay count value may the number of time increments to be counted by variable delay counter 28 before turning on switch T0. In these examples, N-bit counter 24 may be configured to output an activation signal to variable delay counter 28 upon counting the last zero crossing event of the set count value.

Up/down counter 30 may also compare the feedback voltage to three thresholds as described in FIG. 5. By comparing the feedback voltage to three thresholds, the set count value in N-bit counter 24 and the delay count in variable delay counter 28 are controlled by up/down counter 30 to vary the off-time of switch T0 according to the output power level at load 13. Alternatively, in some examples, up/down counter 30 may have one or more look-up tables stored in memory. For example, up/down counter 30 may look up from a first look-up table stored in memory the set count value that corresponds to the output power level. In another example, up/down counter 30 may look up from a second look-up table stored in the memory the delay count value that corresponds to the output power level.

Flyback converter 14 similarly receives power from the input source via the full-wave rectifier. It should be understood that the techniques described in this disclosure are described with respect to a flyback converter for ease of illustration. The techniques described in this disclosure may be extended to other converter topologies.

As illustrated, flyback converter 14 includes a transformer that includes a primary side that includes a primary winding (referred to as "coil 16"), a secondary winding (referred to as "coil 18"), and an auxiliary winding (referred to as "coil 20"). Coil 16 connects to the full-wave rectifier and switch T0. In the example illustrated in FIG. 1, switch T0 is an n-type transistor, and therefore, coil 16 is illustrated as being connected to the drain node of switch T0. For ease of description, the examples are described with respect to coil 16 of the primary side being connected to a drain node of switch T0. However, the techniques described in this disclosure are not so limited and switch T0 may be a p-type transistor. In some examples, switch T0 may be power transistor such as a power metal-oxide-semiconductor field-effect-switch (MOSFET), a Gallium Nitride (GaN) FET, insulated gate bipolar transistor (IGBT), or other types of transistors. In some example, switch T0 may not be transistor and may be other types of switches.

In general, switch T0 may include a first node that couples to coil 16, a second node that controls whether switch T0 is on or off, and a third node through which current outputs switch T0. As an example, in examples where switch T0 is a transistor, the first node of switch T0 that couples to coil 16 may be a drain node of the transistor, the second node of switch T0 that controls whether switch T0 is on or off may be a gate node of the transistor, and the third node of switch T0 through which current outputs switch T0 may be a source node of the transistor.

In the techniques described in this disclosure, controller 12 may control when switch T0 is turned on and turned off to control the amount of current flowing through load 13 such that the average amount of current flowing through load 13 (referred to as the average load current) or the average voltage level at load 13 (referred to as the average load voltage) is at a set load current or load voltage level (e.g., at a target load current level or target load voltage level).

When controller 12 turns on switch T0, current flows through coil 16 (also referred to as inductor 16) and into switch T0 and through the resistor connected at the current sense (CS) pin of controller 12 to ground (GND). Current through coil 16 cannot change instantaneously, and therefore, the current through coil 16 slowly ramps up (and in some examples, linearly ramps up). The current flowing through coil 16 creates a magnetic field, and when current flowing through coil 16 is turned off, the magnetic field induces a current on coil 18 (also referred to as inductor 18)

of the second side that discharges the magnetic field. The current on coil 18 flows through load 13 and charges the battery.

When controller 12 turns off switch T0, current stops flowing into switch T0. However, current does not instantaneously stop flowing through coil 16 due to the inductance of coil 16. Instead, the current through coil 16 slowly ramps down (and in some examples, linearly ramps down) by flowing through the capacitor illustrated on the left of coil 16 and inside flyback converter 14. While current is flowing through coil 16, the current creates a magnetic field. When the current is turned off, the magnetic field creates a secondary current through coil 18 which slowly dissipates (e.g., linearly due to inductance) through load 13 as well and discharges the magnetic field.

If controller 12 turns switch T0 back on before the current through coil 16 and, in some examples, load 13 has reached zero (i.e., an amplitude of zero amps (0 A)), controller 12 may be considered as operating in the continuous conduction mode (CCM). If controller 12 turns switch T0 back on after the current through coil 16, and in some examples, load 13 has reached zero, controller 12 may be considered as operating in the discontinuous conduction mode (DCM). As described in more detail, the techniques described in this disclosure may operate in the DCM, where controller 12 determines when to turn switch T0 back on after the current through coil 16 and in some examples load 13 reaches zero so that average load current or average load voltage is equal to the set load current level or set load voltage level.

For example, as output power reduces from full load, the number of zero crossing events will start to increase up to a particular limit. Zero crossing detection unit 34 of controller 12 may have difficulty in detecting the number of zero crossing events beyond a maximum as the amplitude of the voltage oscillation decreases over time. In some examples, controller 12 may overcome the limitation of the maximum number of zero crossing events by counting a variable delay with variable delay counter 28 when the number of zero crossing has reached the maximum number of zero crossing events. In some examples, the maximum number of zero crossing events that can be detected may be internally defined within controller 12. In some examples, the maximum number of zero crossing events that can be detected may be between five and ten zero crossing events.

For example, zero crossing detection unit 34 may be able to detect a maximum number of seven zero crossing events. In some examples, the output of zero crossing detection unit 34 may be a clock signal to N-bit counter 24. When N-bit counter 24 counts the last zero crossing event of the total number of zero crossing events to be detected, instead of turning on switch T0 maximum limit, N-bit counter 24 may output an activation signal to variable delay counter 28 to introduce a delay after the last zero crossing has been counted. In other words, after N-bit counter 24 counts the clock pulse associated with the last zero crossing event of the total number of zero crossing events, N-bit counter 24 may output the activation signal.

In some examples, the length of the delay may be variable and dependent on the output power level. In some examples, the delay after the last zero crossing event is counted may be a delay count value. In these examples, the delay count value may be one or more time increments, where the one or more time increments are increased according to a fixed time period (e.g., $T_{delpercycle}$). In some examples, the fixed time period (e.g., $T_{delpercycle}$) may be defined internally within controller 12. For example, variable delay counter 28 or up/down counter 30 may internally define the fixed time period. In other examples, variable delay counter 28 may define the fixed time period based on one resonant period between two zero crossing events. For example, optional resonant detection unit 26 may detect a resonant period between two zero crossing events and output the fixed time period to variable delay counter 28 (e.g., output a clock signal with the fixed time period). In other words, variable delay counter 28 may count the one or more time increments with the same resonant period as the zero crossing events. In this way, even though zero crossing detection unit 34 may be unable to detect a zero crossing event beyond a maximum, variable delay counter 28 may allow controller 12 to track the zero crossing events beyond the maximum increasing the switching efficiency of controller 12.

In the techniques described in this disclosure, a controller that controls the amount of current flowing through a load may determine whether a change in the time a switch is turned off (e.g., whether an adjustment in the amount of turn-off time of the switch) is needed to reduce the switching frequency and increase the switching efficiency to a desired level. In the techniques described in this disclosure, the current that flows through the load flows through the switch when the switch is on. If the controller determines that a change in the amount of time the switch is turned off (i.e., time Toff) is needed, the controller may implement one or more of the examples techniques described in this disclosure.

Figure 2:
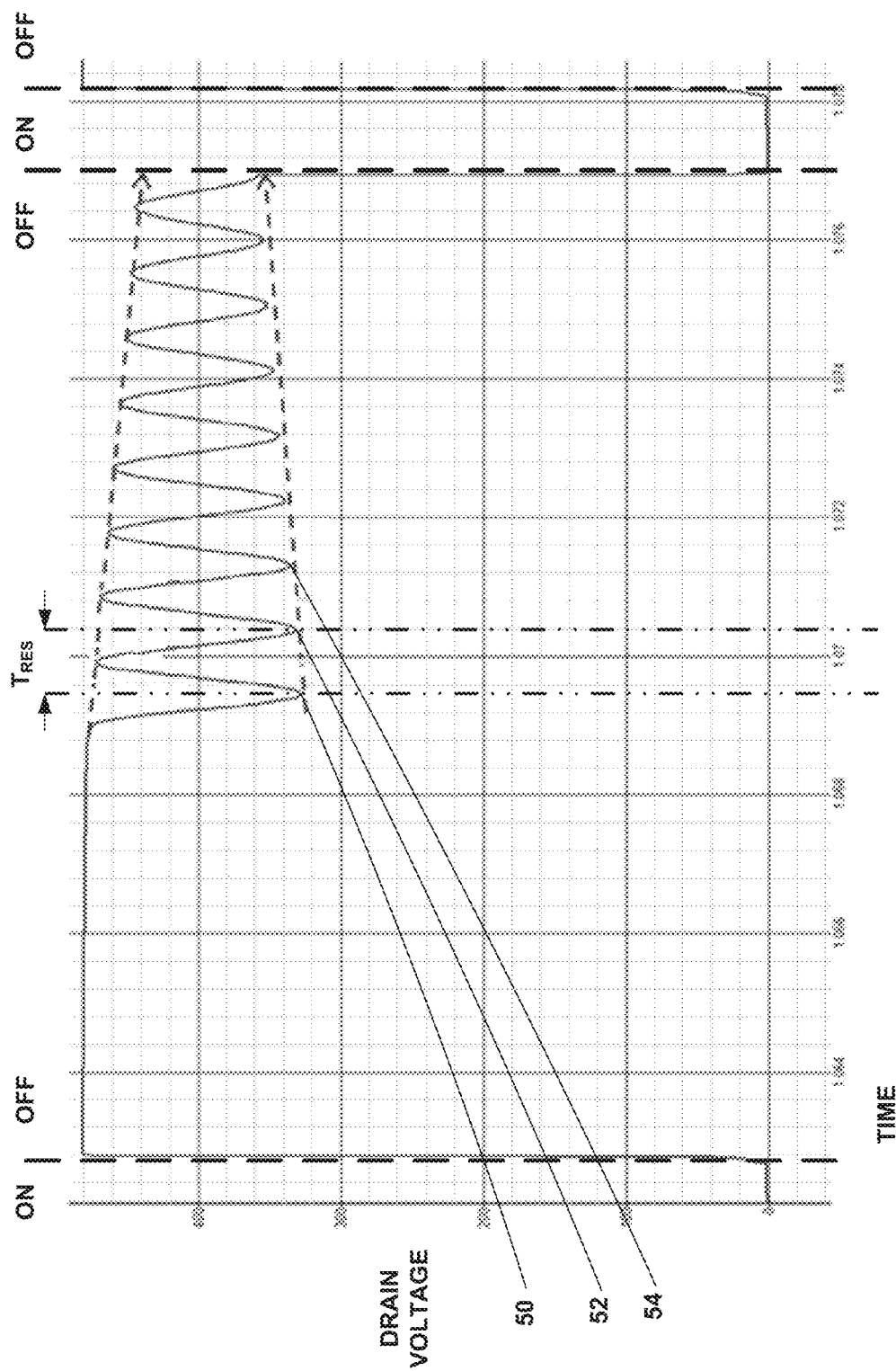
FIG. 2 is a graphical diagram illustrating behavior of a drain voltage at a switch node when the switch is turned off and the current flowing through a coil coupled to the switch becomes zero.

FIG. 2 is a graphical diagram illustrating behavior of a drain voltage at a switch node when switch T0 is turned off and the current flowing through coil 16 coupled to switch T0 becomes zero. FIG. 2 is described with respect to FIG. 1.

For example, the drain voltage $V_{DRAIN}$ may be a reflection of the voltage at the switch node of switch T0 that connects to coil 16 (e.g., the drain node in examples where switch T0 is a transistor). In general, voltage $V_{DRAIN}$ illustrates the behavior of the voltage at the switch node of T0 that connects to coil 16. As illustrated in FIG. 2, during the switch on-duration, the switch node voltage (e.g., the drain voltage of switch T0) is at a constant low voltage level. This constant low voltage level is referred to as the on-duration switch node voltage level. During the switch off-duration, although switch T0 is off, current is still flowing through coil 16, and the switch node voltage is at a relatively constant high voltage level (there may be slight droop).

However, when current though coil 16 reaches zero and switch T0 is off, the switch node voltage begins to oscillate with a resonant period of Tres. The frequency of the oscillation (i.e., 1/Tres) is a function of the components connected to switch T0.

The voltage oscillation at the switch node creates voltage peaks and voltage valleys. The voltage oscillation at the switch node also creates zero crossing events, and the zero crossing events occur when the oscillating voltage at the node shifts from a positive voltage to a negative voltage. For example, as illustrated in FIG. 2, the oscillating voltage (i.e., the voltage that the drain node of the switch when (1) current through coil 16 is zero and (2) switch T0 is off) includes voltage valleys 50-54 with a resonant period Tres. In some examples, voltage valleys 50-54 may correspond to zero crossing events detected by ZCD unit 34.

In the techniques described in this disclosure, the amount of energy needed to turn switch T0 back on may be related to the difference between the on-duration switch node voltage level and the voltage level of the oscillating voltage. The smaller the difference between the on-duration switch node voltage level and the voltage level of the oscillating voltage, the smaller the amount of energy that is needed to allow the switch node voltage to return to the on-duration switch node voltage level when switch T0 is turned back on. The amount of energy needed to return the switch node voltage to the on-duration node voltage level when switch T0 is turned back on is indicated by a switching efficiency of switch T0.

Accordingly, to achieve high switching efficiency, controller 12 may be configured to turn switch T0 on at a time of a voltage valley of the oscillating voltage. For example, the output power level at load 13 may increase to a high level. In this example, controller 12 may be configured to count the number of zero crossing events and turn on switch T0 after counting the third zero crossing event, which may be prior to voltage valley 54. In other words, controller 12 may set the off-time of switch T0 based on a count of a number of zero crossing events. However, as illustrated in FIG. 2, the amplitude of the oscillating voltage decreases over time, and controller 12 may be able to only consistently detect a maximum number of zero crossing events due to the reducing amplitude of the oscillating voltage. In some examples, controller 12 may be able to detect a maximum of three to ten zero crossing events. For example, controller 12 may be able to detect a maximum number of seven zero crossing events.

It should be understood that FIG. 2 illustrates eight voltage valleys for ease of illustration and description. In general, there may be more or less than eight voltage valleys. Therefore, in some examples, controller 12 may be configured to turn switch T0 after counting any number of zero crossing events.

In the above examples, controller 12 may determine the time when switch T0 is to turn on based on a count of a number of zero crossing events in the oscillating voltage. Accordingly, controller 12 may need to be configured to detect when the zero crossing events occur.

Referring back to FIG. 1, the transformer includes a sensing side that includes coil 20. Coil 20 may sense the voltage at coil 16. Because coil 16 is connected to the switch node of switch T0 (e.g., the drain node in the example where switch T0 is a transistor) where the voltage oscillation occurs, coil 20 may sense the voltage at the switch node of switch T0, and feed the voltage into controller 12. For example, system 10 includes voltage divider 22, which is connected to the zero crossing detection (ZCD) pin of controller 12. Therefore, controller 12, via the ZCD pin, receives a fraction of the voltage that tracks the switch node voltage, which is the voltage at the node of switch T0 that is connected to flyback converter 14 (e.g., drain node of switch T0). Voltage divider 22 may be optional or incorporated into controller 12.

For example, if there is voltage oscillation at the switch node, then the voltage oscillation may be sensed by coil 20, divided by voltage divider 22, and coupled into the zero crossing detection (ZCD) pin. Zero crossing detection (ZCD) unit 34 of controller 12 may determine when the sensed voltage drops to below zero (e.g., goes from above zero to below zero) and determine when the sensed voltage reaches a voltage valley. ZCD unit 34 may output a signal to N-bit counter 24 of controller 12 indicating the zero crossing event and that the sensed voltage dropped to a valley. Based on the time when the sensed voltage dropped below zero, ZCD unit 34 may determine the time when a voltage valley will occur in the oscillating voltage.

In the techniques described in this disclosure, the voltage at the switch node begins to oscillate when the current through coil 16 reaches zero. Although controller 12 may not be able to determine the exact time when the oscillation began, controller 12 may still be able to determine when a voltage valley will occur based on the zero crossing detection of the sensed voltage from coil 20.

In the oscillating voltage, there are multiple peaks and valleys, and in some cases, if the amount of time before the switch is to turn on changes (i.e., the turn-off time of the switch changes), it may be possible to turn the switch on at a subsequent zero crossing. In this case, switching efficiency is maintained, or very slightly impacted, because the switch still turns on at a zero crossing, albeit a different zero crossing.

In some examples, the reduction in switching frequency may be achieved by changing the number of zero crossing events that need to be detected or counted according to changes in the load. For example, when there is a reduction in the load, the number of zero crossing events to be detected or counted prior to turning on the switch may be increased thereby increasing time the switch is off (e.g., Toff). In this example, the increase in Toff may reduce the switching frequency as the output power level at the load is reduced thereby reducing or preventing switching losses and increasing switching efficiency.

In these examples, the amount of switching frequency reduction may be limited by the number of zero crossing events that a controller can detect or count. For example, as the period of Toff increases, the magnitude of the oscillating voltage (e.g., the resonant oscillation) may be reduced due to a reduction in energy at the node of the switch. In this example, as the magnitude reduces, the controller may become unable to detect the zero crossing events effectively, which limits the maximum number of zero crossing events that can be detected by the controller.

In other words, controller 12 may be limited in switching frequency reduction when operating in a mode that only counts zero crossing events. For example, controller 12 may be unable to reduce the switching frequency enough (e.g., increasing the switching efficiency) to achieve a desired switching efficiency at light load. In some examples, when controller 12 operates in the mode that only counts zero crossing events, the switching frequency of controller 12 between high input line voltage and low input line voltage may also be significantly different, which may reduce the average switching efficiency of controller 12 at high line. In these examples, the reduction in the average switching efficiency may also increase the difficulty in designing the EMI filter. However, when controller 12 operates in a first mode (e.g., counting zero crossing events) and a second mode (e.g., counting delay increments), controller 12 is not limited in switching frequency reduction thereby increasing the switching efficiency of controller 12.

Figure 3:
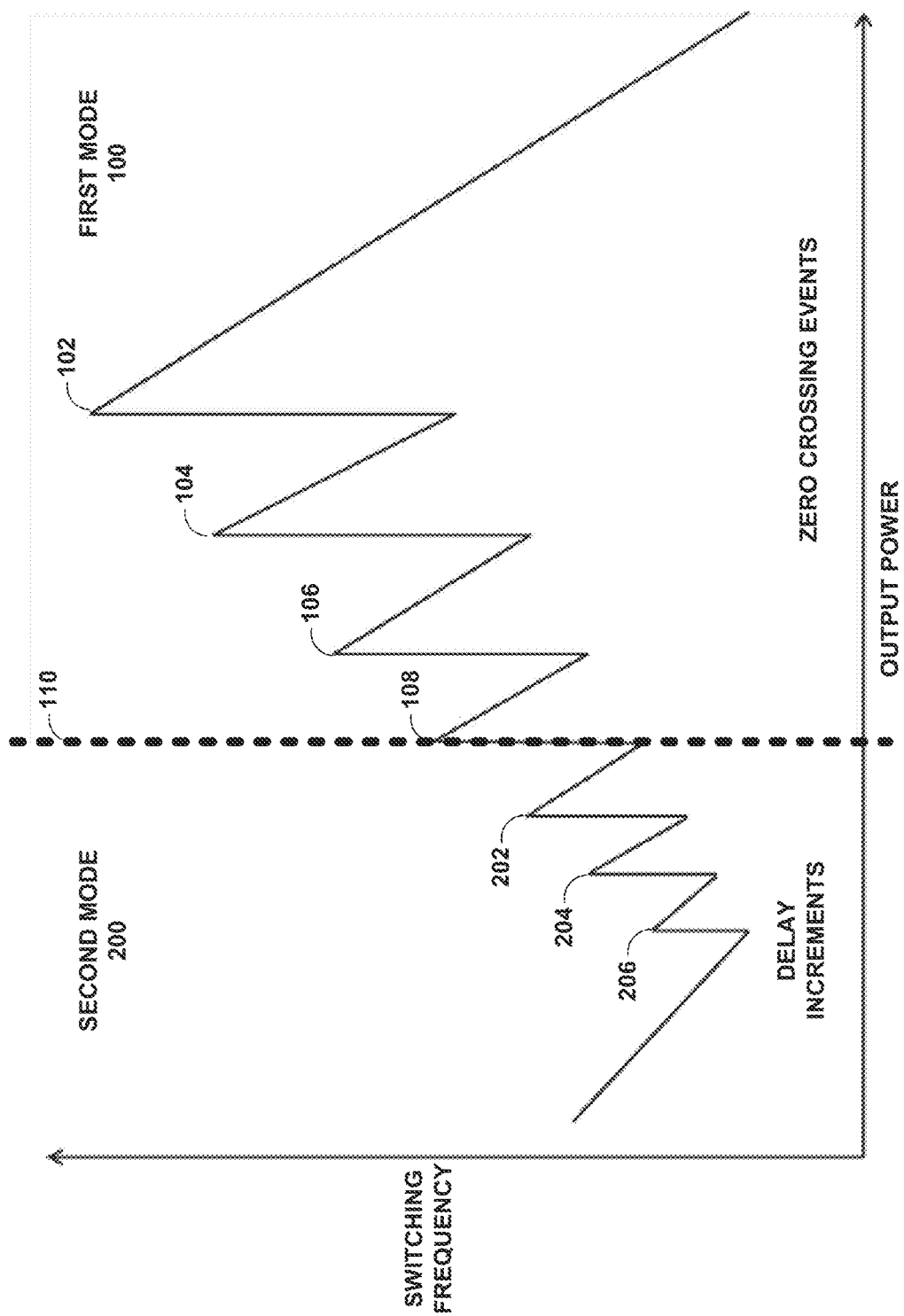
FIG. 3 is a graphical diagram illustrating a first mode and a second mode of a controller.

FIG. 3 is a graphical diagram illustrating first mode 100 and second mode 200 of controller 12. FIG. 3 is described with respect to FIG. 1.

In the example of FIG. 3, controller 12 has first mode 100 and second mode 200. First mode 100 of controller 12 counts plurality of zero crossing events 102-108. In some examples, zero crossing events 102-108 may be the set count value. In some examples, the period between zero crossing events 102-108 may be the resonant period of zero crossing events 102-108.

As illustrated in FIG. 3, zero crossing event 102 is the first zero crossing event occurring at the highest switching frequency and the highest output power. Zero crossing event 104 is the second zero crossing event occurring at a lower switching frequency and output power than zero crossing event 102. Zero crossing event 106 is the third zero crossing event occurring at a lower switching frequency and output power than zero crossing events 102 and 104. Zero crossing event 108 is the fourth and last zero crossing event occurring at a lower switching frequency and output power than zero crossing events 102-106.

In the example of FIG. 3, controller 12 is able count a maximum number of four zero crossing events. As discussed above, this maximum number of four zero crossing events is used for ease of understanding, and controller 12 may count to any number of maximum zero crossing events. Upon counting the last zero crossing event 108, controller 12 determines at dashed line 110 whether controller 12 should change to second mode 200. For example, controller 12 may determine based on the reduction in output power level at load 13 to change to second mode 200.

In the example of FIG. 3, controller 12 changes to second mode 200 after the determination at dashed line 110. In second mode 200, controller 12 counts one or more delay increments. For example, controller 12 counts one or more delay increments 202-206. In some examples, delay increments 202-206 may be the delay count value. In some examples, the period between each of delay increments 202-206 may correspond to one of the resonant period of the zero crossing events 102-108 or an internal pre-defined period within controller 12.

As illustrated in FIG. 3, delay increment 202 is the first delay increment event occurring at a lower switching frequency and output power than zero crossing events 102-108. As illustrated in FIG. 3, delay increment 204 is the second delay increment event occurring at a lower switching frequency and output power than zero crossing events 102-108 and delay increment 202. As illustrated in FIG. 3, delay increment 206 is the third delay increment event occurring at a lower switching frequency and output power than zero crossing events 102-108 and delay increments 202 and 204. After counting delay increment 206, controller 12 may determine the switching frequency has reached a desired switching frequency and turn on switch T0.

In this way, controller 12 may use first mode 100 and second mode 200 to increase the turn off time of switch T0. In some examples, delay increments 202-206 may correspond to a zero crossing event that is not detectable by controller 12 in first mode 100. In these examples, controller 12 may use delay increment 206 to determine a voltage valley and turn on switch T0 on at the corresponding voltage valley thereby increasing the switching efficiency of controller 12 at reduced output power levels.

Figure 4:
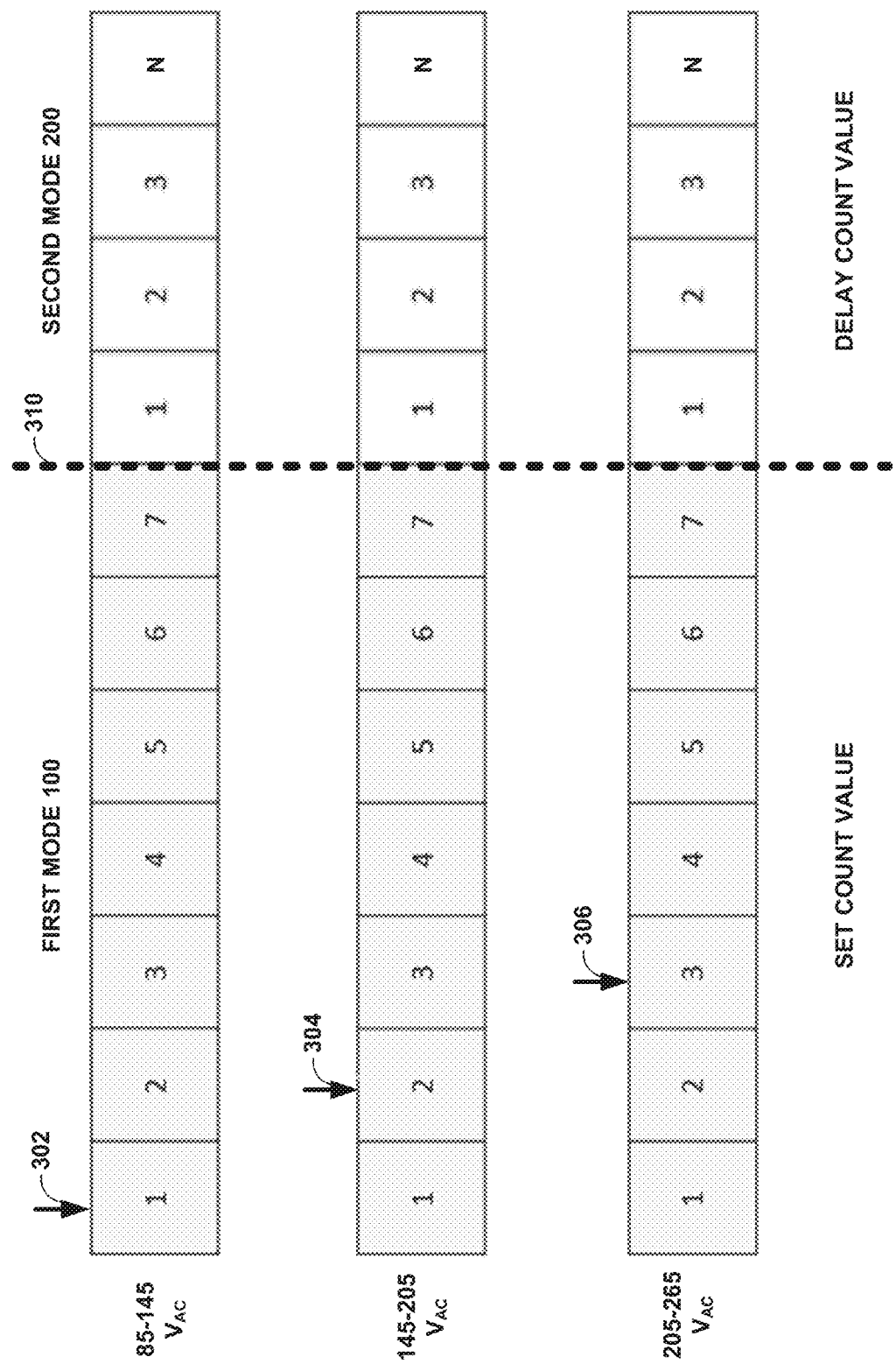
FIG. 4 is block diagram illustrating a zero crossing delay value based on an input voltage level.

FIG. 4 is block diagram illustrating a zero crossing delay value based on an input voltage level. FIG. 4 is described with respect to FIGS. 1 and 3.

The slew rate of the primary current at higher input voltage is higher than the slew rate of the primary current at lower input voltage. Additionally, the resonant period at high line is also lower than the resonant period at low line. In other words, if the starting zero crossing number was the same for whole universal input voltage range (e.g., 85-265 $V_{AC}$) the switching frequency for the same output power level will be higher for the high line input than the switching frequency for the low line input voltage.

N-bit counter 24 of controller 12 may compensate for the switching frequency being higher at high line than the switching frequency at low line by basing the starting zero crossing number on the input voltage level. In other words, N-bit counter 24 may determine a zero crossing delay value based on the input voltage level.

In the example of FIG. 4, N-bit counter 24 may be capable of counting a maximum number of seven zero crossing events because ZCD unit 34 may only be capable of detecting seven zero crossing events. N-bit counter 24 may receive a signal from input voltage detection unit 32 indicative of whether the input voltage level is between 85-145 $V_{AC}$ and use first zero crossing event 302 as the starting zero crossing event. In some examples, input voltage detection unit 32 may detect the amplitude of the negative auxiliary winding voltage that is proportional to the input voltage. N-bit counter 24 may receive a signal from input voltage detection unit 32 indicative of whether the input voltage is between 145-205 $V_{AC}$ and use second zero crossing event 304 as the starting zero crossing event by ignoring first zero crossing event 302. Additionally, N-bit counter 24 receive a signal from input voltage detection unit 32 indicative of whether the input voltage is between 205-265 $V_{AC}$ and use third zero crossing event 306 as the starting zero crossing event by ignoring first and second zero crossing events 302 and 304. In some examples, starting zero crossing events 302-306 may be referred to as the zero crossing delay value. In some examples, N-bit counter 24 may have memory with a look up table storing information, such as the zero crossing delay value corresponding to particular input voltage level.

For example, zero crossing event 302 may correspond to a zero crossing delay value equal to 1. Similarly, zero crossing event 304 may correspond to a zero crossing delay value equal to 2. Additionally, zero crossing event 306 may correspond to a zero crossing delay value equal to 3. For ease of understanding, FIG. 4 is described with only three starting zero crossing events, but the techniques as described herein are not limited to three starting zero crossing events, and it is appreciated that any of the maximum zero crossing events may be used as the starting zero crossing event.

In this way, N-bit counter 24 of controller 12 may count seven, six, or five zero crossing events before changing from first mode 100 to second mode 200 (e.g., outputting a signal to variable delay counter 28) at dashed line 310 when the input voltage is between 85-145, 145-205, and 205-265 $V_{AC}$, respectively. After switching from first mode 100 to second mode 200, variable delay counter 28 of controller 12 may count one or more delay increments (e.g., a delay count value of 1 to N) based on the output power level at load 13 before turning on switch T0 to achieve the desired switching efficiency of controller 12.

Referring back to FIG. 1, controller 12 may detect a feedback voltage level with up/down counter 30 and the feedback voltage level may be indicative of an output power level. Up/down counter 30 may determine a delay count value (e.g., one or more delay increments) and a set count value (e.g., up to a maximum number of zero crossing events) based on the feedback voltage level.

For example, FIG. 5 is a table illustrating an example of operations of up/down counter 30 based on a feedback voltage level. In the example of FIG. 5, when up/down counter 30 of controller 12 detects that the feedback voltage is lower than a first threshold, up/down counter 30 may count upwards, and after the set count value has reached the maximum count, up/down counter 30 may increase the delay count value. In the example of FIG. 5, when up/down counter 30 detects the feedback voltage is higher than the first threshold and lower than a second threshold, up/down counter 30 may stop counting. In the example of FIG. 5, when up/down counter 30 detects the feedback voltage is higher than the second threshold and lower than a third threshold, up/down counter 30 may count downward until the set count value is equal to a default starting count. In the example of FIG. 5, when up/down counter 30 detects the feedback voltage is higher than the third voltage, up/down counter 30 may be set to the default starting count. Up/down counter 30 may output the delay count value to variable delay counter 28 and output the set count value to N-bit counter 24.

Input voltage detection unit 32 of controller 12 may be coupled to the ZCD pin of controller 12 and determines the input voltage level of system 10 based on a clamping current indicative of the input voltage level at the input. Input voltage detection unit 32 outputs the input voltage level to N-bit counter 24 and N-bit counter 24 determines the zero crossing delay value based on the input voltage level from the input voltage detection unit 32.

ZCD unit 34 is also coupled to the ZCD pin and detects zero crossing events (e.g., when the voltage at the node of switch T0 crosses from positive to negative voltage or from negative to positive voltage). After N-bit counter 24 receives the set count value from up/down counter 30 and determines the zero crossing delay value, N-bit counter 24 starts counting zero crossing events based on an output from ZCD unit 34 indicating a zero crossing event has occurred. For example, at high line, where the input voltage level is between 205-265 $V_{AC}$, N-bit counter 24 starts counting at the third zero crossing event 306 until the maximum zero crossing event is counted. Upon counting the last zero crossing event at dashed line 310, N-bit counter 24 outputs an activation signal to variable delay counter 28 to start counting one or more delay increments based on the delay count value. Upon counting the last of the one or more delay increments, variable delay counter 28 may activate switch T0, and switch T0 may control the power delivered to load 13. In some examples, variable delay counter 28 may output a signal to flip-flop 36 that activates switch T0. In some examples, the output of flip-flop 36 may also reset or enable the counting of N-bit counter 24.

FIG. 6 is a chart illustrating example parameters for system 350, in accordance with one or more examples described in this disclosure. In some examples, system 350 may correspond to system 10 as described in FIG. 1. In some examples, system 350 may be a twelve volt, forty-eight watt, ICE2QR0680 demo board.

In the example of FIG. 6, the input voltage of system 350 may be a universal input. In some examples, the universal input may be between 85-265 $V_{AC}$. In the example of FIG. 6, the number of primary turns Np of a primary coil may be thirty-six. In the example of FIG. 6, the number of secondary turns Ns1 of a secondary coil may be six. In the example of FIG. 6, the output voltage may be twelve volts (V). In the example of FIG. 6, the output current may be four amperes (A). In the example of FIG. 6, the drain-source capacitance of a switch may be forty-seven picofarads (pF). In the example of FIG. 6, the inductance of the primary coil may be 359.20 microhenries (μH). In the example of FIG. 6, the resistance of the current sense resistor may be 0.36 ohms.

FIGS. 7A-7B are charts illustrating a comparison between high line and low line for the system of FIG. 6 when using a zero crossing delay value dependent on an input voltage level. FIGS. 7A and 7B are described with respect to FIG. 1.

In the example of FIG. 7A, chart 400 illustrates a comparison between high line voltage 265 $V_{AC}$ and low line voltage 85 $V_{AC}$ in three categories according to the corresponding zero crossing event without the use of a zero crossing delay value. For example, in the first category of time on (Ton), at high line input voltage, controller 12 turns on switch T0 for a maximum of 1.8 microseconds and a minimum of 1.5 microseconds at the first zero crossing event. Comparatively, in the first category of Ton, at low line input voltage, controller 12 turns on switch T0 for a maximum of 8 microseconds and a minimum of 4.5 microseconds at the first zero crossing event.

In the second category of switching frequency, at high line input voltage, controller 12 has a maximum switching frequency of 113.1 kilohertz and a minimum switching frequency of 90 kilohertz at the first zero crossing event. Comparatively, at low line input voltage, controller 12 has a maximum switching frequency of 83.9 kilohertz and a minimum switching frequency of 48.1 kilohertz at the first zero crossing event.

In the third category of input power, at high line input voltage, controller 12 has a maximum input power of 59.8 watts and a minimum input power of 46.6 watts at the first zero crossing event. Comparatively, at low line input voltage, controller 12 has a maximum input power of 62.2 watts and a minimum input power of 34.6 watts at the first zero crossing event.

In the example of FIG. 7B, chart 402 illustrates a comparison between high line voltage 265 $V_{AC}$ and low line voltage 85 $V_{AC}$ in three categories according to the corresponding zero crossing event with the use of a zero crossing delay value. For example, in the first category of time on (Ton), at high line input voltage, controller 12 turns on switch T0 for a maximum of 1.8 microseconds and a minimum of 1.5 microseconds at the third zero crossing event according to the zero crossing delay value. Comparatively, in the first category of Ton, at low line input voltage, controller 12 turns on switch To for a maximum of 8 microseconds and a minimum of 4.5 microseconds at the first zero crossing event according to the zero crossing delay value.

In the second category of switching frequency, at high line input voltage, controller 12 has a maximum switching frequency of 95.5 kilohertz and a minimum switching frequency of 78.5 kilohertz at the third zero crossing event (e.g., dashed circle 406) according to the zero crossing delay value. Comparatively, at low line input voltage, controller 12 has a maximum switching frequency of 83.9 kilohertz and a minimum switching frequency of 48.1 kilohertz at the first zero crossing event according to the zero crossing delay value.

In the third category of input power, at high line input voltage, controller 12 has a maximum input power of 52.1 watts and a minimum input power of 39.4 watts at the third zero crossing event (e.g., dashed circle 408) according to the zero crossing delay value. Comparatively, at low line input voltage, controller 12 has a maximum input power of 62.2 watts and a minimum input power of 34.6 watts at the first zero crossing event according to the zero crossing delay value.

In this way, at high line input voltage the zero crossing delay value may reduce the maximum switching frequency from 113.1 kilohertz to 95.5 kilohertz and the minimum switching frequency from 90 kilohertz to 78.5 kilohertz. In other words, the operating frequency of system 10 at high line will be reduced, which will increase the switching efficiency of system 10 at high line. Additionally, the difference in the operating frequency of system 10 between high line and low line will also be reduced, which will increase the overall switching efficiency of system 10 between high line and low line.

FIG. 8 is a chart illustrating a comparison between high line and low line for the system of FIG. 6 when using a delay count value and a set count value based on an output power level. FIG. 8 is described with respect to FIG. 1.

In the example of FIG. 8, chart 410 illustrates a comparison between high line voltage 265 $V_{AC}$ and low line voltage 85 $V_{AC}$ in switching frequency according to the corresponding zero crossing event with and without the use of a zero crossing delay value. In the example of FIG. 8, at high line input voltage, controller 12 has a maximum switching frequency of 130.7 kilohertz and a minimum switching frequency of 62.5 kilohertz at the seventh zero crossing event without the zero crossing delay value. Comparatively, at low line input voltage, controller 12 has a maximum switching frequency of 117.6 kilohertz and a minimum switching frequency of 47 kilohertz at the seventh zero crossing event without the zero crossing delay value.

In the example of FIG. 8, at high line input voltage, controller 12 has a maximum switching frequency of 85.2 kilohertz and a minimum switching frequency of 49.8 kilohertz at the seventh zero crossing event with the zero crossing delay value (e.g., five delay increments). Comparatively, at low line input voltage, controller 12 has a maximum switching frequency of 79.5 kilohertz and a minimum switching frequency of 39.4 kilohertz at the seventh zero crossing event with the zero crossing delay value (e.g., five delay increments).

In this way, at high line input voltage the delay count value may reduce the maximum switching frequency from 130.7 kilohertz to 85.2 kilohertz and the minimum switching frequency from 62.5 kilohertz to 49.8 kilohertz. Further, at low line input voltage the delay count value may reduce the maximum switching frequency from 117.6 kilohertz to 79.5 kilohertz and the minimum switching frequency from 47 kilohertz to 39.4 kilohertz. In other words, the operating frequency of system 10 at high line and low line will be reduced, which will increase the switching efficiency of system 10 at both high line and low line. Additionally, the difference in the operating frequency of system 10 between high line and low line will also be reduced, which will increase the overall switching efficiency of system 10 between high line and low line.

Figure 9:
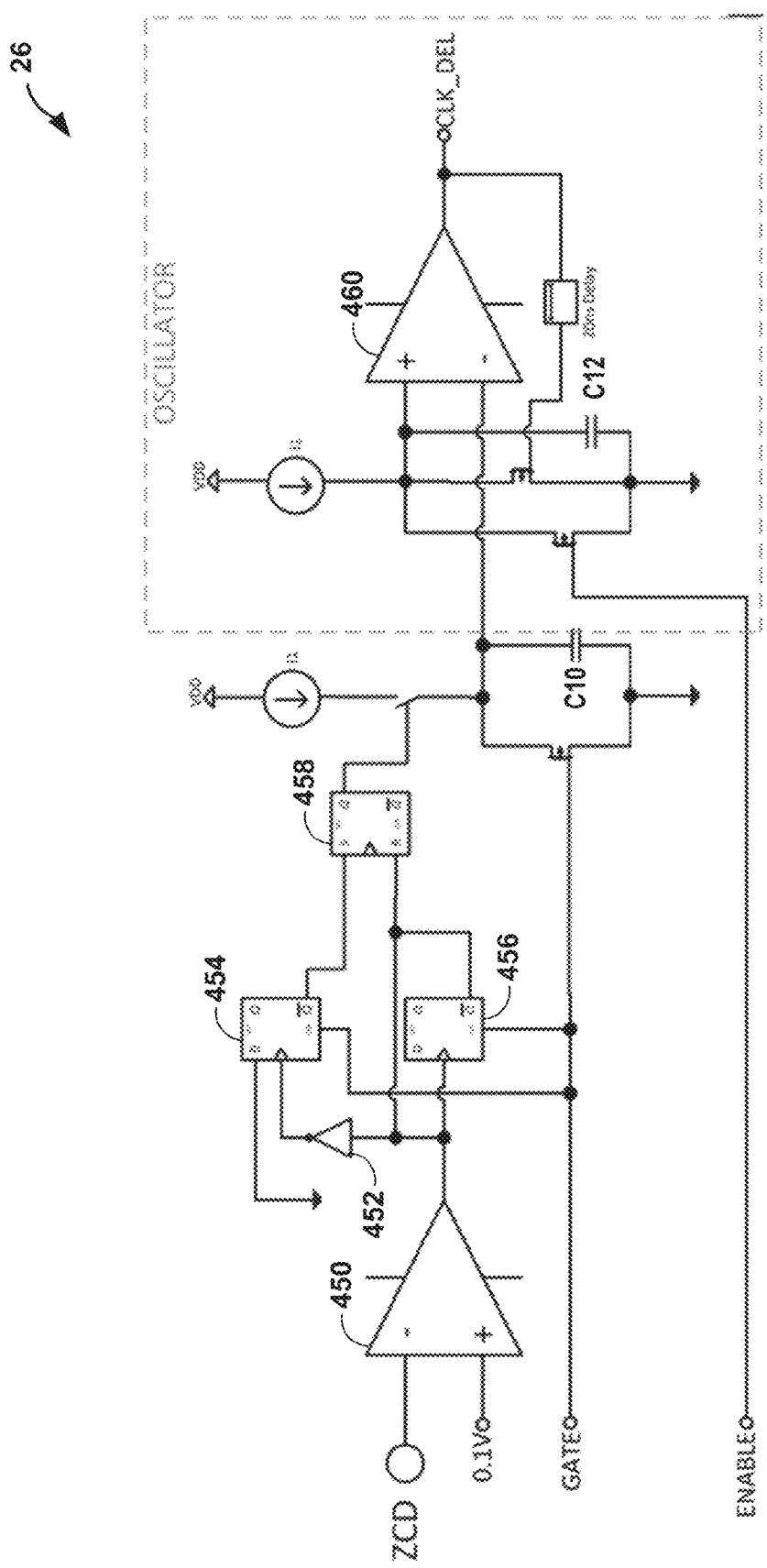
FIG. 9 is a circuit diagram illustrating an example analog implementation of a resonant period detection unit.

FIG. 9 is a circuit diagram illustrating an example analog implementation of resonant period detection unit 26. In the example of FIG. 9, resonant period detection unit 26 includes comparator 450, inverter 452, D Flip-flops 454 and 456, SR Flip-flop 458, and operational amplifier 460. In the example of FIG. 9, the ZCD pin is connected to the non-inverting input of comparator 450 and a voltage source of 0.1 volts (V) is connected to the inverting input of comparator 450. In the example of FIG. 9, when the voltage ramp on the ZCD pin drops below 100 millivolts for the first time, comparator 450 will output a signal to D Flip-flops 454 and 456. D Flip-flops 454 and 456 will output a signal to SR Flip-flop that activates a switch between a current source and capacitor C10. In other words, capacitor C10 is allowed to charge from zero when the first zero crossing is detected.

In the example of FIG. 9, when the voltage ramp on the ZCD pin drops below 100 millivolts after the first time, comparator 450 will output a signal to D Flip-flops 454 and 456. D Flip-flops 454 and 456 will output a signal to SR Flip-flop that deactivates a switch between a current source and capacitor C10. In other words, capacitor C10 will stop charging when the second zero crossing event or subsequent zero crossing event is detected by resonant period detection unit 26. In this way, the voltage at capacitor C10 will be held and used as a voltage reference for operational amplifier 460 in the oscillator. The period of the oscillator will be equivalent to one resonant period.

For example, ENABLE is the signal used to enable the oscillator when variable delay counter 28 is required. When the oscillator receives the ENABLE signal, the oscillator will charge capacitor C12 until a voltage at capacitor C12 is equal to the reference voltage of operational amplifier 460 or the voltage held at capacitor C10 and operational amplifier 460 will output CLK_DEL, where CLK_DEL is the clock signal used for the variable delay counter 28. Capacitor C12 may be discharged with the feedback of the CLK_DEL signal. Resonant period detection unit 26 may be reset when GATE is turned ON, which resets D Flip-flips 454 and 456.

Figure 10:
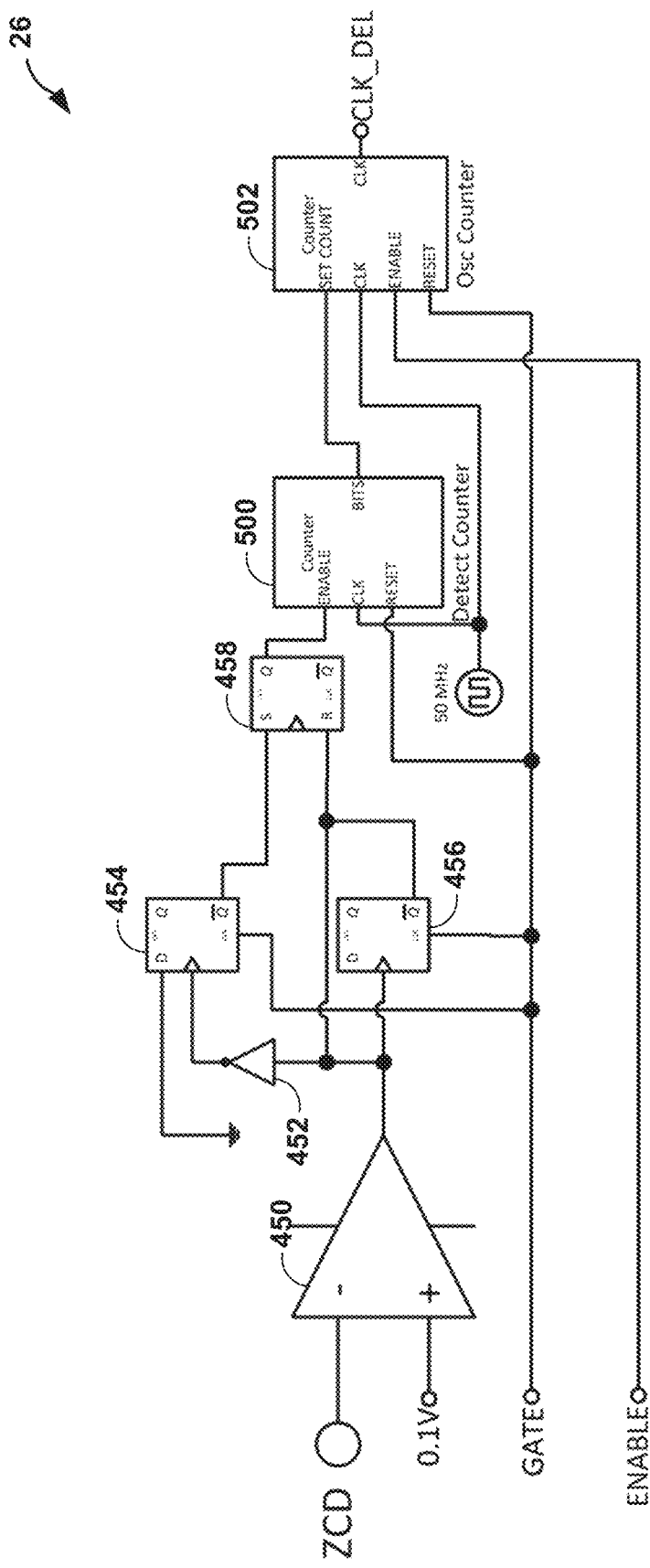
FIG. 10 is a circuit diagram illustrating an example digital implementation of the resonant period detection unit.

FIG. 10 is a circuit diagram illustrating an example digital implementation of resonant period detection unit 26. In the example of FIG. 10, resonant period detection unit 26 includes comparator 450, inverter 452, D Flip-flops 454 and 456, SR Flip-flop 458, detect counter 500, and Osc counter 502. In the example of FIG. 10, the ZCD pin is connected to the non-inverting input of comparator 450 and a voltage source of 0.1 volts (V) is connected to the inverting input of comparator 450.

In the example of FIG. 10, when the voltage ramp on the ZCD pin drops below 100 millivolts for the first time, comparator 450 will output a signal to D Flip-flops 454 and 456. D Flip-flops 454 and 456 will output a signal to SR Flip-flop that outputs a signal to the ENABLE of detect counter 500. In other words, when the first zero crossing is detected, detect counter 500 will start counting using an internal clock (e.g., a 50 MHz clock).

In the example of FIG. 10, when the voltage ramp on the ZCD pin drops below 100 millivolts after the first time, comparator 450 will output a signal to D Flip-flops 454 and 456. D Flip-flops 454 and 456 will output a signal to SR Flip-flop that outputs a second signal to the ENABLE of detect counter 500. In other words, detect counter 500 will stop counting when the second zero crossing event or subsequent zero crossing event is detected. Detect counter 500 will use its bits (e.g., the count value) to set the count for Osc counter 502. An output pulse from Osc counter 502 may be produced when the count is reached. In this way, the bits from detect counter 500 may correspond to one resonant period and Osc counter 502 may store the bits corresponding to one resonant period. ENABLE is the signal used to enable the Osc counter 502 when the variable delay counter 28 is required. CLK_DEL is the clock signal used for the variable delay counter 28. Resonant period detection unit 26 may be reset when GATE is turned ON, which resets D Flip-flips 454 and 456, detect counter 500, and Osc counter 502.

Figure 11:
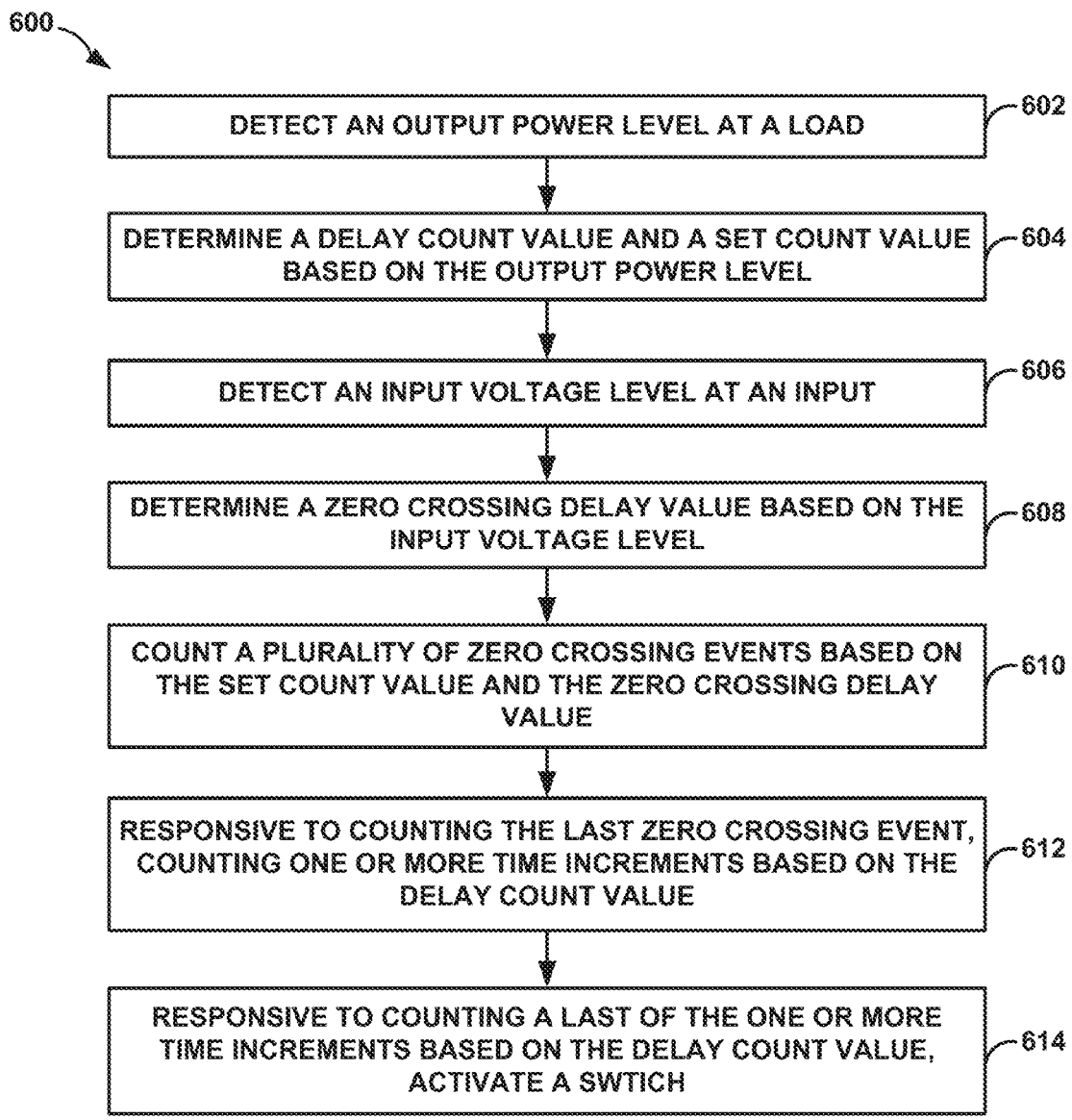
FIG. 11 is a flowchart illustrating an example technique for operating a controller, in accordance with this disclosure.

FIG. 11 is a flowchart illustrating an example technique 600 for operating a controller, in accordance with this disclosure. FIG. 11 is described with respect to the units of controller 12 of FIG. 1. In the example of FIG. 11, controller 12 includes N-bit counter 24, resonant period detection unit 26, variable delay counter 28, up/down counter 30, input voltage detection unit 32, zero crossing detection (ZCD) unit 34, and flip-flop 36.

For example, up/down counter 30 may detect output power level at load 13 (602). In some examples, up/down counter 30 may detect a feedback voltage from secondary coil 18 that is indicative of the output power level at load 13. Up/down counter 30 may determine a delay count value and a set count value based on the output power level (604). In some examples, up/down counter 30 may determine the delay count value and the set count value based on the feedback voltage indicative of the output power level. In some examples, up/down counter 30 may output the delay count value to variable delay counter 28. In some examples, up/down counter 30 may output the set count value to N-bit counter 24. In some examples, up/down counter 30 may determine the delay count value includes retrieving a predefined number of the one or more time increments associated with the output power level from a look-up table stored in memory of controller 12. In some examples, up/down counter 30 may determine the set count value includes retrieving a predefined number of the plurality of zero crossing events associated with the output power level from a second look-up table stored in the memory of controller 12.

In some examples, up/down counter 30 may determine the delay count value and the set count value based on the output power level by comparing a feedback voltage level to three threshold voltage levels, wherein the first threshold voltage level is less than the second threshold voltage level, and wherein the second threshold voltage level is less than the third threshold voltage level, counting upwards with an up/down counter in response to the feedback voltage level being less than the first threshold voltage level, not counting with the up/down counter in response to the feedback voltage level being greater than first threshold voltage level and less than the second threshold voltage level, counting downwards with the up/down counter in response to the feedback voltage level being greater than the second threshold voltage level and less than the third threshold voltage level until the up/down counter reaches a default start count, and resetting the up/down counter to the default start count in response to the feedback voltage level being greater than the third threshold voltage level. In some examples, a count value of up/down counter 30 may correspond to the set count value and the delay count value. In some examples, the delay count value may be equal to the count value minus a maximum number of zero crossing events.

Input voltage detection unit 32 may detect an input voltage level at an input (606). In some examples input voltage detection unit 32 may be coupled to the ZCD pin of controller 12 and detects a clamping current that is indicative of the input voltage level at the input. Input voltage detection unit 32 may output a signal indicative of the input voltage level to N-bit counter 24. N-bit counter 24 may determine a zero crossing delay value based on the input voltage level (608). In some examples, N-Bit counter 24 may determine the zero crossing delay value by retrieving a predefined number of zero crossing events associated with the input voltage level from a look-up table stored in memory of N-bit counter 24.

ZCD unit 34 may detect a zero crossing event at the ZCD pin of controller 12. ZCD unit 34 may output a signal indicative of the zero crossing event to N-bit counter 24. N-bit counter 24 may count a plurality of zero crossing events based on the set count value from up/down counter 30 and the zero crossing delay value (610). N-bit counter 24 may output a start signal to variable delay counter 28 to count one or more time increments based on the delay count value in response to counting the last zero crossing event (612). In some examples, where the delay count value is zero, variable delay counter 28 may not count any of the one or more time increments, but output an activation signal to activate a switch.

Variable delay counter 28 may output an activation signal to activate a switch in response to counting the one or more time increments based on the delay count value (614). In some examples, variable delay counter 28 may output a signal to flip flop 36 that turns on the gate of switch T0.

In some examples, technique 600 further includes detecting a resonant period between two zero crossing events, wherein each of the one or more time increments is based on one of a predefined amount of time or the resonant period between the two zero crossing events.

The following examples illustrate methods, devices, and systems described herein.

Example 1 a method for controlling power delivered to a load, the method comprising detecting an output power level at the load, determining a delay count value and a set count value based on the output power level, detecting an input voltage level at an input, determining a zero crossing delay value based on the input voltage level, counting a plurality of zero crossing events based on the set count value and the zero crossing delay value, responsive to counting a last of the plurality of zero crossing events, counting one or more time increments based on the delay count value, and responsive to counting a last of the one or more time increments, activating a switch, wherein the switch controls the power delivered to the load.

Example 2 the method of example 1, wherein determining the delay count value and the set count value based on the output power level comprises comparing a feedback voltage level to three threshold voltage levels, wherein the first threshold voltage level is less than the second threshold voltage level, and wherein the second threshold voltage level is less than the third threshold voltage level, counting upwards with an up/down counter in response to the feedback voltage level being less than the first threshold voltage level, not counting with the up/down counter in response to the feedback voltage level being greater than first threshold voltage level and less than the second threshold voltage level, counting downwards with the up/down counter in response to the feedback voltage level being greater than the second threshold voltage level and less than the third threshold voltage level until the up/down counter reaches a default start count, and resetting the up/down counter to the default start count in response to the feedback voltage level being greater than the third threshold voltage level.

Example 3 the method of example 2, wherein a count value of the up/down counter corresponds to the set count value and the delay count value.

Example 4 the method of example 3, wherein the delay count value is equal to the count value minus a maximum number of zero crossing events.

Example 5 the method of any of examples 1 to 4, wherein determining the zero crossing delay value comprises retrieving a predefined number of zero crossing events associated with the input voltage level from a look-up table stored in memory.

Example 6 the method of any of examples 1 to 5, further comprising detecting a resonant period between two zero crossing events, wherein each of the one or more time increments is based on one of a predefined amount of time or the resonant period between the two zero crossing events.

Example 7 a system for controlling power delivered to a load, the system comprising a transformer comprising a primary side that includes a first coil and a secondary side that includes a second coil, wherein the load is connected to the second coil, a switch coupled to the first coil, and a controller coupled to the switch and configured to detect an output power level at the load, determine a delay count value and a set count value based on the output power level, detect an input voltage level at an input, determine a zero crossing delay value based on the input voltage level, count a plurality of zero crossing events based on the set count value and the zero crossing delay value, responsive to counting a last of the plurality of zero crossing events, counting one or more time increments based on the delay count value, and responsive to counting a last of the one or more time increments, activating a switch, wherein the switch controls the power delivered to the load.

Example 8 the system of example 7, wherein the controller is configured to determine the delay count value and the set count value based on the output power level comprises the controller configured to compare a feedback voltage level to three threshold voltage levels, wherein the first threshold voltage level is less than the second threshold voltage level, and wherein the second threshold voltage level is less than the third threshold voltage level, count upwards with an up/down counter in response to the feedback voltage level being less than the first threshold voltage level, not count with the up/down counter in response to the feedback voltage level being greater than first threshold voltage level and less than the second threshold voltage level, count downwards with the up/down counter in response to the feedback voltage level being greater than the second threshold voltage level and less than the third threshold voltage level until the up/down counter reaches a default start count, and reset the up/down counter to the default start count in response to the feedback voltage level being greater than the third threshold voltage level.

Example 9 the system of example 8, wherein a count value of the up/down counter corresponds to the set count value and the delay count value.

Example 10 the system of example 9, wherein the delay count value is equal to the count value minus a maximum number of zero crossing events.

Example 11 the system of any of examples 7 to 10, wherein the controller is configured to determine the zero crossing delay value comprises the controller configured to retrieve a predefined number of zero crossing events associated with the input voltage level from a look-up table stored in memory.

Example 12 the system of any of examples 7 to 11, further comprising the controller configured to detect a resonant period between two zero crossing events, wherein each of the one or more time increments is based on one of a predefined amount of time or the resonant period between the two zero crossing events.

Example 13 a controller for controlling power delivered to a load, the controller comprising an up/down counter unit configured to detect an output power level at the load, determine a delay count value and a set count value based on the output power level, and output the delay count value and the set count value, a first counter unit configured to receive the set count value from the up/down counter unit, detect an input voltage level at an input, determine a zero crossing delay value based on the input voltage level, count a plurality of zero crossing events based on the set count value and the zero crossing delay value, and output an indication after counting a last zero crossing event of the plurality of zero crossing events, and a second counter unit configured to receive the delay count value from the up/down counter unit, receive the indication of the last zero crossing event from the first counter unit, count one or more time increments based on the delay count value, and activate a switch in response to counting a last of the one or more time increments, wherein the switch controls the power delivered to the load.

Example 14 the controller of example 13, wherein the up/down counter unit is configured to determine the delay count value and the set count value based on the output power level comprises the up/down counter unit configured to compare a feedback voltage level to three threshold voltage levels, wherein the first threshold voltage level is less than the second threshold voltage level, and wherein the second threshold voltage level is less than the third threshold voltage level, count upwards with the up/down counter unit in response to the feedback voltage level being less than the first threshold voltage level, not count with the up/down counter unit in response to the feedback voltage level being greater than first threshold voltage level and less than the second threshold voltage level, count downwards with the up/down counter unit in response to the feedback voltage level being greater than the second threshold voltage level and less than the third threshold voltage level until the up/down counter unit reaches a default start count, and reset the up/down counter unit to the default start count in response to the feedback voltage level being greater than the third threshold voltage level.

Example 15 the controller of example 14, wherein a count value of the up/down counter corresponds to the set count value and the delay count value.

Example 16 the controller of example 15, wherein the delay count value is equal to the count value minus a maximum number of zero crossing events.

Example 17 the controller of any of examples 13 to 16, wherein the first counter unit comprises memory, wherein the first counter unit is configured to determine the zero crossing delay value comprises the first counter unit configured to retrieve a predefined number of zero crossing events associated with the input voltage level from a look-up table stored in the memory.

Example 18 the controller of any of examples 13 to 17, further comprising a resonant period detection unit configured to detect a resonant period between two zero crossing events, and output the resonant period to the second counter unit, wherein each of the one or more time increments of the second counter unit are based on the resonant period between the two zero crossing events.

Example 19 the controller of any of examples 13 to 18, wherein each of the one or more time increments of the second counter unit are based on a predefined amount of time.

Example 20 the controller of any of examples 13 to 19, wherein the first counter unit is configured to receive a reset count input upon activation of the switch.

In one or more examples, the functions described may be implemented in hardware, software, firmware, or any combination thereof. If implemented in software, the functions may be stored on, as one or more instructions or code, a computer-readable medium and executed by a hardware-based processing unit (e.g., N-bit counter 24 of controller 12). Computer-readable media may include computer-readable storage media, which corresponds to a tangible medium such as data storage media. In this manner, computer-readable media generally may correspond to tangible computer-readable storage media which is non-transitory. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. It should be understood that computer-readable storage media and data storage media do not include carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors (e.g., N-bit counter 24 of controller 12), such as one or more digital signal processors (DSPs), general purpose microprocessors, application specific integrated circuits (ASICs), field programmable logic arrays (FPGAs), or other equivalent integrated or discrete logic circuitry. Accordingly, the term "processor" or "controller" as used herein may refer to any of the foregoing structure or any other structure suitable for implementation of the techniques described herein. Also, the techniques could be fully implemented in one or more circuits or logic elements.

The techniques of this disclosure may be implemented in a wide variety of devices or apparatuses, including an integrated circuit (IC) or a set of ICs (e.g., a chip set). Various components, units, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples have been described. These and other examples are within the scope of the following claims.

What is claimed is:

1. A method for controlling power delivered to a load, the method comprising:
    detecting an output power level at the load;
    determining a delay count value and a set count value based on the output power level, wherein determining the delay count value and the set count value based on the output power level comprises comparing a feedback voltage level to three threshold voltage levels including a first threshold voltage level, a second threshold voltage level and a third threshold voltage level, wherein the first threshold voltage level is less than the second threshold voltage level and the second threshold voltage level is less than the third threshold voltage level, and controlling an up/down counter based on the comparing;
    detecting an input voltage level at an input;
    selecting a zero crossing delay value from a plurality of zero crossing delay values based on magnitude of the input voltage level;
    counting a plurality of zero crossing events based on the set count value and the zero crossing delay value;
    responsive to counting a last of the plurality of zero crossing events, counting one or more time increments based on the delay count value; and
    responsive to counting a last of the one or more time increments, activating a switch, wherein the switch controls the power delivered to the load.

2. The method of claim 1, wherein determining the delay count value and the set count value based on the output power level further comprises:
    counting upwards with the up/down counter in response to the feedback voltage level being less than the first threshold voltage level;
    not counting with the up/down counter in response to the feedback voltage level being greater than first threshold voltage level and less than the second threshold voltage level;
    counting downwards with the up/down counter in response to the feedback voltage level being greater than the second threshold voltage level and less than the third threshold voltage level until the up/down counter reaches a default start count; and
    resetting the up/down counter to the default start count in response to the feedback voltage level being greater than the third threshold voltage level.

3. The method of claim 2, wherein a count value of the up/down counter corresponds to the set count value and the delay count value.

4. The method of claim 3, wherein the delay count value is equal to the count value minus a maximum number of zero crossing events.

5. The method of claim 1, wherein determining the zero crossing delay value comprises retrieving a predefined number of zero crossing events associated with the input voltage level from a look-up table stored in memory.

6. The method of claim 1, further comprising detecting a resonant period between two zero crossing events, wherein each of the one or more time increments is based on one of a predefined amount of time or the resonant period between the two zero crossing events.

7. A system for controlling power delivered to a load, the system comprising:
   a transformer comprising a primary side that includes a first coil and a secondary side that includes a second coil, wherein the load is connected to the second coil;
   a switch coupled to the first coil; and
   a controller coupled to the switch and configured to:
      detect an output power level at the load,
      determine a delay count value and a set count value based on the output power level, wherein to determine the delay count value and the set count value based on the output power level the controller is configured to:
         compare a feedback voltage level to three threshold voltage levels including a first threshold voltage level, a second threshold voltage level and a third threshold voltage level, wherein the first threshold voltage level is less than the second threshold voltage level and the second threshold voltage level is less than the third threshold voltage level; and
         control an up/down counter based on the compare,
      detect an input voltage level at an input,
      select a zero crossing delay value from a plurality of zero crossing delay values based on magnitude of the input voltage level,
      count a plurality of zero crossing events based on the set count value and the zero crossing delay value,
      responsive to counting a last of the plurality of zero crossing events, counting one or more time increments based on the delay count value, and
      responsive to counting a last of the one or more time increments, activating a switch, wherein the switch controls the power delivered to the load.

8. The system of claim 7, wherein to determine the delay count value and the set count value based on the output power level the controller is further configured to:
   count upwards with the up/down counter in response to the feedback voltage level being less than the first threshold voltage level,
   not count with the up/down counter in response to the feedback voltage level being greater than first threshold voltage level and less than the second threshold voltage level,
   count downwards with the up/down counter in response to the feedback voltage level being greater than the second threshold voltage level and less than the third threshold voltage level until the up/down counter reaches a default start count, and
   reset the up/down counter to the default start count in response to the feedback voltage level being greater than the third threshold voltage level.

9. The system of claim 8, wherein a count value of the up/down counter corresponds to the set count value and the delay count value.

10. The system of claim 9, wherein the delay count value is equal to the count value minus a maximum number of zero crossing events.

11. The system of claim 7, wherein the controller is configured to determine the zero crossing delay value comprises the controller configured to retrieve a predefined number of zero crossing events associated with the input voltage level from a look-up table stored in memory.

12. The system of claim 7, further comprising the controller configured to detect a resonant period between two zero crossing events, wherein each of the one or more time increments is based on one of a predefined amount of time or the resonant period between the two zero crossing events.

13. A controller for controlling power delivered to a load, the controller comprising:
   an up/down counter unit configured to:
      detect an output power level at the load,
      determine a delay count value and a set count value based on the output power level, and
      output the delay count value and the set count value;
   a first counter unit configured to:
      receive the set count value from the up/down counter unit,
      detect an input voltage level at an input,
      select a zero crossing delay value from a plurality of zero crossing delay values based on magnitude of the input voltage level,
      count a plurality of zero crossing events based on the set count value and the zero crossing delay value, and
      output an indication after counting a last zero crossing event of the plurality of zero crossing events; and
   a second counter unit configured to:
      receive the delay count value from the up/down counter unit,
      receive the indication of the last zero crossing event from the first counter unit,
      count one or more time increments based on the delay count value, and
      activate a switch in response to counting a last of the one or more time increments, wherein the switch controls the power delivered to the load.

14. The controller of claim 13, wherein the up/down counter unit is configured to determine the delay count value and the set count value based on the output power level comprises the up/down counter unit configured to:
   compare a feedback voltage level to three threshold voltage levels, wherein the first threshold voltage level is less than the second threshold voltage level, and wherein the second threshold voltage level is less than the third threshold voltage level,
   count upwards with the up/down counter unit in response to the feedback voltage level being less than the first threshold voltage level,
   not count with the up/down counter unit in response to the feedback voltage level being greater than first threshold voltage level and less than the second threshold voltage level,
   count downwards with the up/down counter unit in response to the feedback voltage level being greater than the second threshold voltage level and less than the third threshold voltage level until the up/down counter unit reaches a default start count, and
   reset the up/down counter unit to the default start count in response to the feedback voltage level being greater than the third threshold voltage level.

15. The controller of claim 14, wherein a count value of the up/down counter corresponds to the set count value and the delay count value.

16. The controller of claim 15, wherein the delay count value is equal to the count value minus a maximum number of zero crossing events.

17. The controller of claim 13, wherein the first counter unit comprises memory, wherein the first counter unit is configured to determine the zero crossing delay value comprises the first counter unit configured to retrieve a predefined number of zero crossing events associated with the input voltage level from a look-up table stored in the memory.

18. The controller of claim 13, further comprising a resonant period detection unit configured to:
  detect a resonant period between two zero crossing events, and
  output the resonant period to the second counter, wherein each of the one or more time increments of the second counter unit are based on the resonant period between the two zero crossing events.

19. The controller of claim 13, wherein each of the one or more time increments of the second counter unit are based on a predefined amount of time.

20. The controller of claim 13, wherein the first counter unit is configured to receive a reset count input upon activation of the switch.

* * * * *